United States Patent
Handa et al.

(10) Patent No.: US 9,816,479 B2
(45) Date of Patent: Nov. 14, 2017

(54) UNDERWATER DEVICE

(71) Applicant: IHI Corporation, Tokyo (JP)

(72) Inventors: Norihisa Handa, Tokyo (JP); Shigeki Nagaya, Tokyo (JP); Yoshiyuki Yamane, Tokyo (JP)

(73) Assignee: IHI CORPORATION, Tokyo (JP)

( * ) Notice: Subject to any disclaimer, the term of this patent is extended or adjusted under 35 U.S.C. 154(b) by 154 days.

(21) Appl. No.: 14/870,776

(22) Filed: Sep. 30, 2015

(65) Prior Publication Data

US 2016/0017859 A1 Jan. 21, 2016

Related U.S. Application Data

(63) Continuation of application No. PCT/JP2014/059834, filed on Apr. 3, 2014.

(30) Foreign Application Priority Data

Apr. 3, 2013 (JP) .................................. 2013-077660

(51) Int. Cl.
*F03B 13/10* (2006.01)
*F03B 17/06* (2006.01)
*F03B 13/26* (2006.01)

(52) U.S. Cl.
CPC ............ *F03B 13/10* (2013.01); *F03B 13/264* (2013.01); *F03B 17/06* (2013.01); *F03B 17/061* (2013.01);
(Continued)

(58) Field of Classification Search
CPC ........ F03B 13/10; F03B 17/06; F03B 13/264; F03B 17/061; Y02E 10/38; Y02E 10/28; F05B 2270/18
(Continued)

(56) References Cited

U.S. PATENT DOCUMENTS 3,171,376 A * 3/1965 Sellner .................... B63G 8/22
                                                  114/333
6,091,161 A * 7/2000 Dehlsen .................. B63G 8/18
                                                   290/43
(Continued)

FOREIGN PATENT DOCUMENTS

CN         102745318 A       10/2012
EP        2 146 089 A1        1/2010
(Continued)

OTHER PUBLICATIONS

Examination Report dated Oct. 22, 2015 in corresponding Taiwan Patent Application No. 103112460 (with an English translation) (10 pages).

(Continued)

*Primary Examiner* — Hoang Nguyen
(74) *Attorney, Agent, or Firm* — Rothwell, Figg, Ernst & Manbeck, P.C.

(57) ABSTRACT

A pod of an ocean current power generation device which is serving as an underwater floating-type underwater device is provided with a ballast tank and an air storage tank. When discharging water from the ballast tank, by opening a water discharge valve and driving a water discharge pump, water inside the ballast tank is discharged to the outside through a water conduit. When supplying water, by opening a water supply valve while the water pressure outside the pod is greater than the water pressure inside the ballast tank, water is made to flow from the outside of the pod through an aperture portion, and into the ballast tank via the water conduit.

16 Claims, 6 Drawing Sheets

(52) U.S. Cl.
CPC ........... *F05B 2270/18* (2013.01); *Y02E 10/28* (2013.01); *Y02E 10/38* (2013.01)

(58) Field of Classification Search
USPC ............................ 60/495–497; 114/331, 333
See application file for complete search history.

(56) References Cited

U.S. PATENT DOCUMENTS

| | | | | |
|---|---|---|---|---|
| 6,772,592 | B2* | 8/2004 | Gerber | F03B 13/1845 290/53 |
| 7,213,532 | B1* | 5/2007 | Simpson | B63C 11/42 114/331 |
| 2003/0075096 | A1* | 4/2003 | Leonard | B63G 8/24 114/331 |
| 2016/0201641 | A1 | 7/2016 | Handa et al. | |

FOREIGN PATENT DOCUMENTS

| | | |
|---|---|---|
| JP | 54-74043 A | 6/1979 |
| JP | 3-7280 Y2 | 2/1991 |
| JP | 2002-535188 A | 10/2002 |
| JP | 2009-114904 A | 5/2009 |
| JP | 2010-25100 A | 2/2010 |
| JP | 2012-532267 A | 12/2012 |
| TW | 166251 | 8/1991 |
| WO | 00/42318 A1 | 7/2000 |
| WO | 2011/008351 A1 | 1/2011 |

OTHER PUBLICATIONS

International Search Report dated Jun. 17, 2014 in PCT/JP2014/059834 (4 pages).
U.S. Appl. No. 14/875,824, Handa et al, filed Oct. 6, 2015.

* cited by examiner

UNDERWATER DEVICE

This application is a continuation application based on a PCT Patent Application No. PCT/JP2014/059834, filed on Apr. 3, 2014, whose priority is claimed on Japanese Patent Application No. 2013-077660, filed Apr. 3, 2013. The contents of both the PCT Application and the Japanese Application are incorporated herein by reference.

TECHNICAL FIELD

The present disclosure relates to an underwater floating-type underwater device such as an underwater floating-type ocean current power generation device in which pods that are provided with a turbine and a power generator are able to float both upwards and downwards.

TECHNICAL BACKGROUND

In recent years, ocean current power generation devices that generate power using energy from seawater flows such as ocean currents and tidal currents and the like have been developed.

Typically, ocean current power generation devices have a turbine that is located underwater and is rotated by a flow of seawater, and use the rotation of this turbine to drive a power generator so as to generate power. Such turbines include horizontal axis turbines in which the axis of rotation is parallel (i.e., horizontal) to the flow of seawater, and vertical axis turbines in which the axis of rotation is perpendicular to the flow of seawater.

A semi-submersible ocean current power generation device (see Patent document 1) has been developed as an actual ocean current power generation device. This semi-submersible ocean current power generation device is provided with three hollow columns that, when seen in plan view, are placed at the respective apex points of a triangle, and with propeller water wheels (i.e., horizontal axis turbines) that are provided on each one of these hollow columns and are rotated by the flow of seawater. The ocean current power generation device is driven by this rotation of the propeller water wheels so as to generate power.

CITATION LIST

Patent Document

[Patent document 1] Japanese Unexamined Patent Application No. 2009-114904

SUMMARY OF DISCLOSURE

Technical Problem

In the case of the semi-submersible ocean current power generation device described in the aforementioned Patent document 1, it is possible to switch between an operating state in which the propeller water wheels are submerged, and a holding state in which the propeller water wheels are exposed on the sea surface by supplying water to the hollow columns or discharging water from the hollow columns.

In contrast, an underwater floating-type power generation device also exists as an ocean current power generation device. In this underwater floating-type power generation device, pods that are internally provided with a turbine and a power generation device are completely submerged underwater. These pods are able to float by being moored to the seabed. In this type of power generation device, it is necessary to precisely adjust the buoyancy in accordance with the strength of the ocean current and the rotation of the turbine in order for the pods to be held at the optimum water depth.

Accordingly, a structure may be considered in which, for example, a ballast tank is provided inside the pod, and the buoyancy of the pod is adjusted by filling or emptying the ballast tank. In this case, the structure is simple. Namely, a tank containing compressed air is provided in the pod together with the ballast tank, and water is discharged from the ballast tank by supplying this compressed air to the ballast tank. When supplying water to the ballast tank, the air inside the ballast tank is discharged to the sea. However, in a structure such as this, once the previously stored compressed air has all been discharged, then it is not possible to fill the tank again with water. As a result, it is not possible for the pod buoyancy to be precisely adjusted repeatedly, so that operations in the long term are not possible.

Another means of adjusting the buoyancy is to employ a method in which fixed ballast is provided in advance in the pod. When the pod is to be floated up, this upward flotation is achieved by discarding this fixed ballast. However, in this method as well, once all the fixed ballast has been discarded, it is difficult to thereafter achieve a downward motion and it is not possible for buoyancy adjustment to be performed repeatedly.

The present disclosure was conceived in order to solve the above-described problem, and it is an object thereof to provide an underwater floating-type underwater device that allows precise buoyancy adjustments to be made repeatedly.

Solution to Problem

In order to achieve the above-described objects, a first aspect of the present disclosure is an underwater floating-type underwater device that includes: a buoyancy adjustment unit that adjusts buoyancy by supplying or discharging water; a water discharge device that discharges water from the buoyancy adjustment unit; and a gas storage device inside which a compressed gas is stored in advance, and that, when water is being discharged from the buoyancy adjustment unit by the water discharge device, supplies its internally stored compressed gas to the buoyancy adjustment unit, and that, when water is being supplied to the buoyancy adjustment unit, receives the supplied gas back into its interior.

A second aspect of the present disclosure is the above-described first aspect wherein the underwater device is an underwater floating-type ocean current power generation device that is provided with: a turbine that is rotated by a flow of seawater; and a pod that supports the turbine and also houses a power generation unit that generates power using the rotation of the turbine.

Effects of Disclosure

In the present disclosure which utilizes the above-described device, in an underwater floating-type underwater device, in addition to a buoyancy adjustment unit there is provided an air storage device that stores compressed air internally. When water is being discharged from the buoyancy adjustment unit, compressed air is supplied from the air storage device to the buoyancy adjustment unit. When water is being supplied to the buoyancy adjustment unit, the gas that had been supplied thereto is returned to the interior of the air storage device.

In this manner, by expelling air from the buoyancy adjustment unit or supplying it to the buoyancy adjustment unit in accordance with the supply or discharge of water thereto, it is possible to prevent the gas inside the gas storage device from being consumed without the gas that is stored inside the gas storage device having to be discharged to the outside.

As a result, it is possible to make repeated precise adjustments to the buoyancy using the buoyancy adjustment unit.

DESCRIPTION OF EMBODIMENT

Hereinafter, embodiments of the present disclosure will be described based on the drawings.

Figure 1:
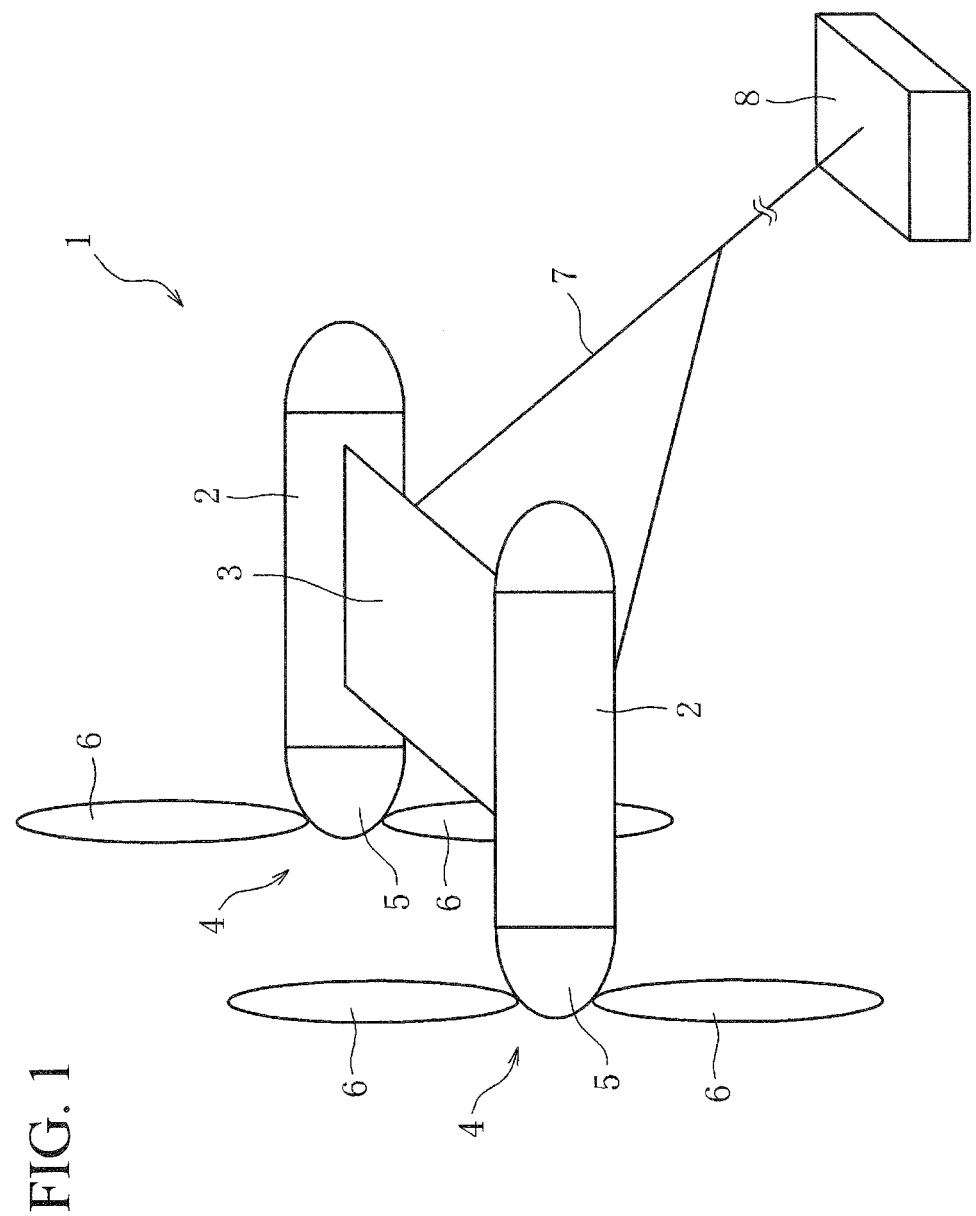
FIG. 1 is an overall structural diagram of an ocean current power generation device according to a first embodiment of the present disclosure.

In FIG. 1 the overall structure of an ocean current power generation device serving as a first embodiment of the underwater device of the present disclosure is shown.

As is shown in FIG. 1, the ocean current power generation device 1 is what is known as a twin-motor ocean current power generator in which a pair of left and right pods 2 and 2 are connected together by a connecting beam 3, and turbines 4 and 4 are provided in the tail portion of the respective pods 2 and 2.

The turbines 4 are provided with two blades 6 and 6 that extend from a hub portion 5, which is located at the center of rotation, in mutually opposite directions perpendicularly to the direction of the axis of rotation. The rotation directions of the turbines 4 and 4 that are provided on the pair of left and right pods 2 and 2 are mutually opposite directions, and the rotation torque generated by the rotation of the two turbines 4 and 4 is cancelled out by their counter rotation.

One end of respective mooring cables 7 is connected to the underside central portion of the respective pods 2, and these two mooring cables 7 are joined together partway down their length so that, overall, they form a Y shape. The other end of the mooring cable 7 is connected to a sinker 8. The sinker 8 is fixed to the seabed, and the pods 2 and 2 are moored to the sinker 8 via the mooring cable 7. Note that a power supply cable (not shown) extends from each of the pods 2 and 2 in parallel with the mooring cables 7, and the power supply cables are connected to a transformer that is provided on the seabed.

Figure 2:
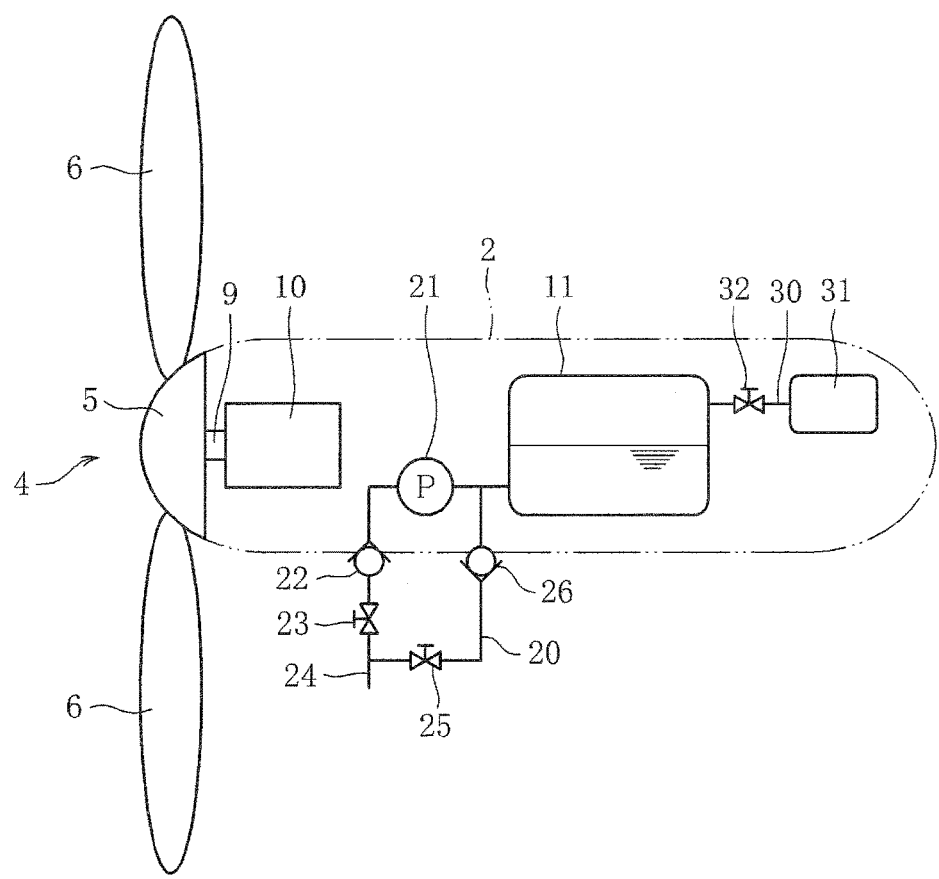
FIG. 2 is an internal structural diagram of a pod according to the first embodiment of the present disclosure.

Next, the internal structure of one of the pods 2 is shown in FIG. 2. Note that because the other pod 2 has the same structure, a description of the other pod 2 is omitted.

As is shown in FIG. 2, a power generator 10 (i.e., a power generation unit) that is connected via the hub portion 5 and a rotation shaft 9 of the turbine 4 is provided inside the pod 2. As the blades 6 and 6 receive the flow of seawater the hub 5 is made to rotate, and the rotation shaft 9 is thereby also rotated. As a result, the power generator 10 is able to generate power and this power is transmitted via a power transmission cable (not shown).

Moreover, a ballast tank 11 (i.e. a buoyancy adjustment unit) that adjusts the buoyancy of the pod 2 is provided inside the pod 2.

A water discharge pump 21 (i.e., a water discharge device) that discharges water from inside the ballast tank 11 is connected via a water conduit 20 to the underside of the ballast tank 11. In addition, a water discharge valve 23 that adjusts the quantity of discharged water is provided via a non-return valve 22 on the water conduit 20 on the downstream side of the water discharge pump 21. Furthermore, an aperture portion 24 that opens onto the outside of the pod 2 is formed further on the downstream side of the water conduit 20. A branch of the water conduit 20 is formed between the aperture portion 24 and the water discharge valve 23, and this branch connects to a point between the ballast tank 11 and the water discharge pump 21 via a water supply valve 25 and a non-return valve 26 that adjust the quantity of water supplied to the ballast tank 11.

Moreover, a gas storage tank 31 (i.e., a gas storage device) is connected via an air duct 30 to the upper side of the ballast tank 11. The interior of this gas storage tank 31 is filled with compressed air that has been compressed to a water pressure that corresponds to the depth to which the pod 2 is able to be submerged. For example, if the pod 2 is able to be submerged to a depth of 200 meters, then the gas storage tank 31 is filled with air that has been compressed to 20 atmospheres (i.e., gauge pressure). An air valve 32 that adjusts the circulation of gas in the air duct 30 is also provided on the air duct 30.

In the ocean current power generation device 1 having the above-described structure, when, for example, the pod 2 is on the sea surface, the ballast tank 11 is filled with water. When the pod 2 has been submerged to a predetermined depth, a portion of the water inside the ballast tank 11 is discharged so as to increase the buoyancy and thereby maintain that depth.

The pod 2 floats underwater so as to face in the direction of the ocean current. The turbine 4 is rotated by the flow of seawater generated by the ocean current, and this causes power to be generated by the power generator 10. As a result of the turbine 4 rotating and thrust being thereby generated towards the ocean current downstream side, the mooring cable 7 becomes taut. If the ocean current then weakens, the rotation speed of the turbine 4 also decreases. Because of this, the pod 2 floats upwards to a shallower depth. In contrast, if the ocean current becomes stronger, the rotation speed of the turbine 4 increases and the thrust also increases. Because of this, the pod 2 sinks lower while moving to the downstream side using the connecting portion between the mooring table 7 and the sinker 8 as a fulcrum, and floats at a deeper water depth.

In the ocean current power generation device 1, if the pod 2 is moved from a predetermined floating position due to changes in the strength of the ocean current or the like, then water is either supplied to or discharged from the interior of the ballast tank 11 in order to return the pod 2 to an appropriate floating position. For example, when the rotation speed of the turbine 4 increases beyond the rotation speed of the turbine 4 that is generated when the turbine 4 is in a predetermined floating position, the ocean current power generation device 1 causes water to be discharged from the ballast tank 11 in order to suppress the sinking of the pod 2. In contrast, when the rotation speed of the turbine 4 decreases, water is supplied to the ballast tank 11 in order to suppress the upward flotation of the pod 2. By supplying water to the ballast tank 11 or discharging it from the ballast tank 11 in accordance with the rotation speed of the turbine 4 in this manner, the floating position of the pod 2 can be easily and precisely adjusted to the appropriate position.

Moreover, because a ballast tank 11 is provided for each one of the pair of left and right pods 2 and 2 in the ocean current power generation device 1, the attitude of the pods 2 and 2 can be controlled by adjusting the supply or discharge of water in the respective ballast tanks 11. For example, by adjusting the water inside the respective ballast tanks 11 such that the overall buoyancy thereof is increased or decreased at the same time as the balance of the buoyancy of the left and right pods 2 and 2 is maintained, the pair of left and right pods 2 and 2 can be raised or lowered while being held horizontally.

Figure 3A:
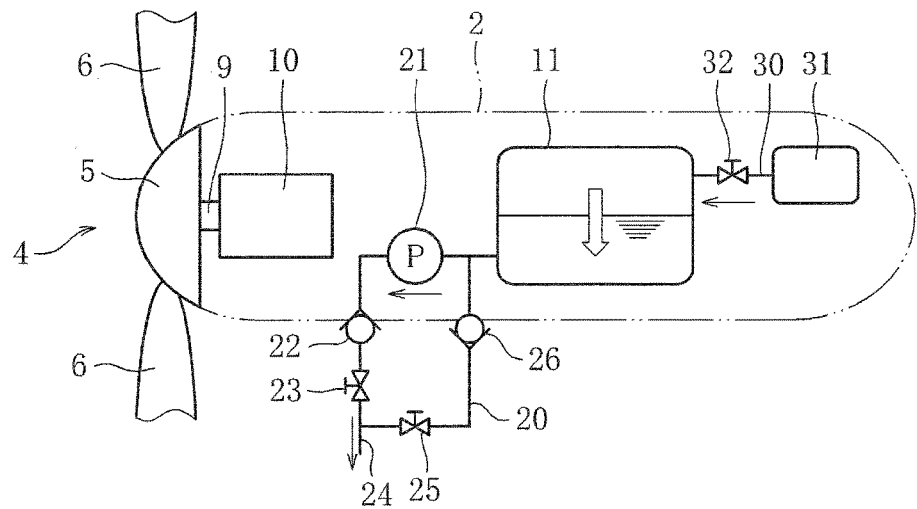
FIG. 3A is a view showing a state of the ocean current power generation device according to the first embodiment of the present disclosure when water is being discharged.
Figure 3B:
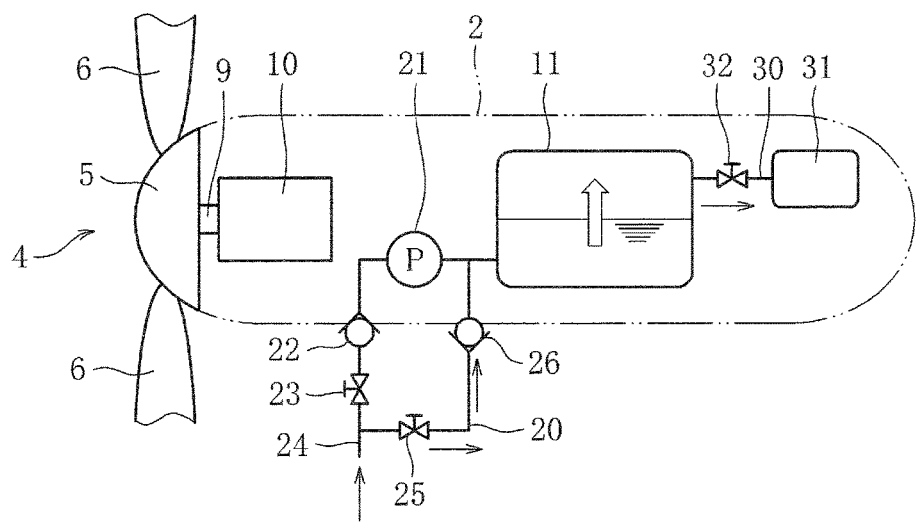
FIG. 3B is a view showing a state of the ocean current power generation device according to the first embodiment of the present disclosure when water is being supplied.

Here, the states during both a discharge of water (FIG. 3A) and a supply of water (FIG. 3B) to the ocean current power generation device according to the first embodiment are shown in FIGS. 3A and 3B. Hereinafter, the supplying of water to the ballast tank 11 and the discharging of water from the ballast tank 11 will be described in detail based on these drawings. Note that in FIGS. 3A and 3B as well, the internal structure of only one of the pods 2 is shown, however, in the following description, the buoyancies of each one of the pair of left and right pods 2 and 2 are held in balance, and it is assumed that the ballast tank of the other pod 2 is performing the same type of operation.

As is shown in FIG. 3A, when discharging water from the ballast tank 11, by opening the water discharge valve 23 and driving the water discharge pump 21, the water inside the ballast tank 11 is made to pass through the water conduit 20 and is discharged to the outside. Note that because the water supply valve 25 is closed and also because the non-return valve 26 is provided, water is unable to flow in the portion of the water conduit 20 where the water supply valve 25 is provided. Moreover, by opening the air valve 32 at the same time as this water is being discharged, the compressed air inside the storage tank 31 is made to pass along the air duct 30 and is supplied to the interior of the ballast tank 11 so as to accelerate the water discharge. As a result of this, the quantity of water inside the ballast tank 11 is decreased so that the buoyancy thereof is increased, and the pod 2 floats upwards.

In contrast, as is shown in FIG. 3B, when supplying water to the ballast tank 11, by opening the water supply valve 25 while the water pressure outside the pod 2 is higher than the water pressure inside the ballast tank 11, seawater (i.e., water) is allowed to flow from the outside of the pod 2 through the aperture portion 24 and into the ballast tank 11 via the water conduit 20. Note that water is prevented by the non-return valve 22 from flowing through the portion of the water conduit 20 where the water discharge valve 23 is provided. Moreover, by opening the air valve 32 at the same time as this water is being supplied, the air inside the ballast tank 11 is compressed by the external water pressure, and this compressed air is returned to the air storage tank 31. As a result of this, the quantity of water inside the ballast tank 11 is increased so that the buoyancy thereof is decreased, and the pod 2 sinks downwards.

In this manner, in the underwater floating-type ocean current power generation device 1, by expelling air from the ballast tank 11 or supplying it to the ballast tank 11 in accordance with the supply or discharge of water thereto, it is possible to prevent the air inside the air storage tank 31 from being consumed without the air that is stored inside the air storage tank 31 having to be discharged to the outside. As a consequence of this, it is possible to repeatedly perform the supplying of water to the ballast tank 11 or the discharging of water from the ballast tank 11, and it is thereby possible to repeatedly make precise adjustments to the floating position of the pod 2.

Moreover, particularly when water is being supplied to the ballast tank 11, this water can be supplied using the seawater pressure outside the pod 2 without a pump or the like having to be provided, and it is also possible to fill the air storage tank 31 with compressed air using the air that has been expelled from the ballast tank 11. By doing this, it is possible to reduce the number of parts used, and to thereby also reduce costs.

Next, a second embodiment of the present disclosure will be described.

Figure 4:
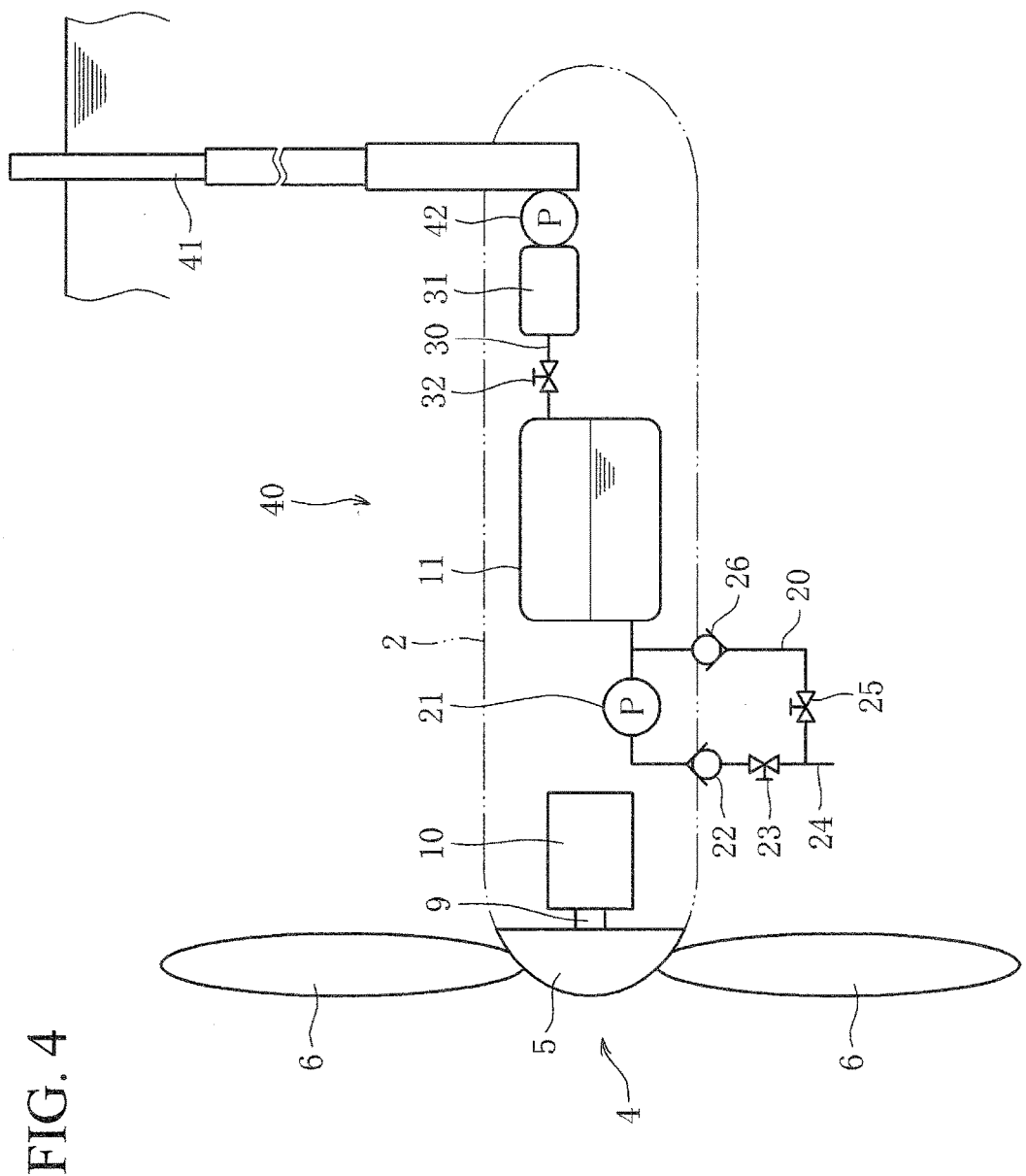
FIG. 4 is a view showing an operating state of an ocean current power generation device according to a second embodiment of the present disclosure.

The schematic structure of an ocean current power generation device serving as a second embodiment of the underwater device of the present disclosure is shown in FIG. 4.

Note that in the ocean current power generation device of the second embodiment, component elements having the same structure as in the above-described first embodiment are given the same descriptive symbols and any detailed description thereof is omitted.

In the ocean current power generation device 40 shown in FIG. 4, in addition to the structure of the ocean current power generation device 1 of the above-described first embodiment, an air duct 41 (i.e., a duct component) that is able to be extended or contracted by means of a telescopic mechanism is provided in each one of the pods 2. The air duct 41 is formed from a rigid material that is able to withstand the seawater currents.

When in operation, the air duct 41 extends from a head portion side of the pod 2 such that a distal end thereof opens above the surface of the sea. In addition, a base portion of the air duct 41 is connected to the air storage tank 31 via a compressor pump 42 (i.e., a gas compression device). The compression pump 42 is provided in order to compress air (i.e., external air) from above the sea surface that it has taken in via the air duct 41, and then fill the interior of the air storage tank 31 with this air.

In the same way as in the above-described first embodiment, the ocean current power generation device 40 of the second embodiment, which has the above-described structure, is able to supply water to the ballast tank 11 or discharge it from the ballast tank 11 in order to precisely adjust the floating position of the pod 2. Moreover, even if the air inside the air storage tank 31 escapes to the outside of the pod 2 because of a fault or the like, it is possible to replenish the compressed air while the pod 2 is still underwater without it having to rise to the sea surface.

Moreover, because the air duct 41 can be extended or contracted by means of a telescopic mechanism, at times when there is no need for air to be either taken in or expelled, the air duct 41 can be contracted and housed inside the pod 2. By doing this, it is possible to prevent the load acting on the pod 2 from being increased as a result of the air duct 41 being extended, and to prevent any flotsam or the like from coming into contact with the air duct 41.

In this manner, in addition to the same effects as in the above-described first embodiment being achieved, the ocean current power generation device 40 according to the second embodiment is able to be operated even more safely.

In the present disclosure, when water is being discharged from the ballast tank 11, the water inside the ballast tank 11 is pushed to the outside by the air supplied to the interior of the ballast tank 11 from the air storage tank 31 in resistance to the water pressure inside the ballast tank 11. In this case, the air supplied to the interior of the ballast tank 11 from the air storage tank 31 is dissolved in the water inside the ballast tank 11, and is discharged to the outside together with this water. This tendency becomes more pronounced as the water pressure inside the ballast tank 11 increases. Consideration might also be given to changing the air that is supplied to the interior of the ballast tank 11 from the air storage tank 31 into air bubbles, and then discharging these air bubbles to the outside together with the water inside the ballast tank 11.

As a result of this, there is a possibility that the air stored inside the air storage tank 31 will decrease as the water inside the ballast tank 11 is discharged, and that this air will impede the discharge of water from the ballast tank 11.

This problem can be solved by preventing any contact between the water inside the ballast tank 11 and the air that is supplied to the interior of the ballast tank 11 from the air storage tank 31. The structure shown, for example, in FIGS. 5A through 5C is a specific example of a means of preventing contact between air and the water inside the ballast tank 11.

Figure 5A:
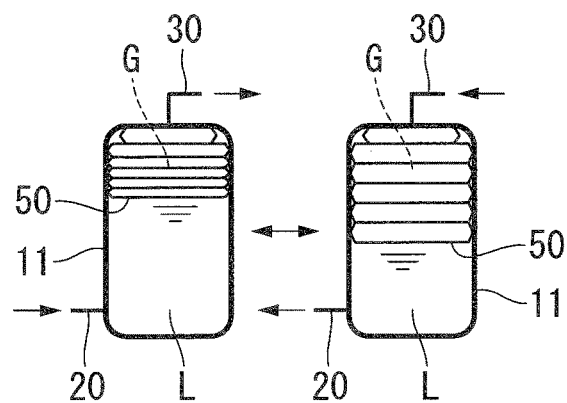
FIG. 5A is a typical view of a cross-section of a ballast tank showing an example of the structure of a separator device that is applied to the present disclosure.
Figure 5B:
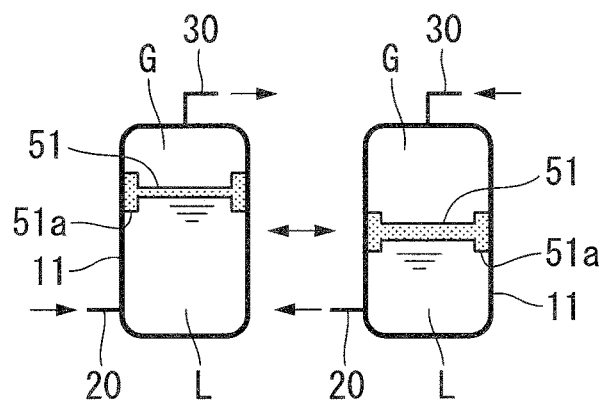
FIG. 5B is a typical view of a cross-section of a ballast tank showing an example of the structure of a separator device that is applied to the present disclosure.
Figure 5C:
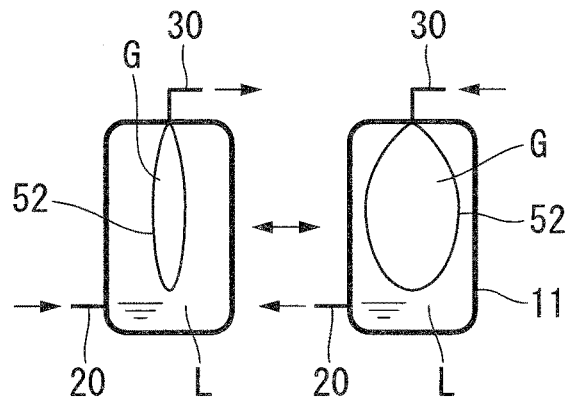
FIG. 5C is a typical view of a cross-section of a ballast tank showing an example of the structure of a separator device that is applied to the present disclosure.

FIGS. 5A through 5C are typical views showing a cross section of the ballast tank 11. Separator apparatuses 50, 51, and 52 are provided inside the ballast tank 11. The separator apparatuses 50, 51, and 52 separate water that is supplied to the interior of the ballast tank 11 from outside the pod 2 via the water conduit 20 from air that is supplied to the interior of the ballast tank 11 from the air storage tank 31 via the air duct 30. Note that in FIGS. 5A through 5C, the left-side diagram shows a state when water is being supplied to the ballast tank 11, while the right-side diagram shows a state when water is being discharged from the ballast tank 11.

The separator apparatus 50 shown in FIG. 5A is a bag-shaped container that is supported at a top end portion of the interior of the ballast tank 11, and has a bellows-shaped side surface that expands and contracts vertically along an internal circumferential surface of the ballast tank 11. An internal portion of the separator apparatus 50 is connected at a top end thereof to the air duct 30. Namely, the interior of the ballast tank 11 is separated by the separator apparatus 50 into an air chamber G that is formed inside the separator apparatus 50, and a liquid chamber L that is foamed outside the separator apparatus 50.

When supplying water to the ballast tank 11, by opening the water supply valve 25 while the water pressure outside the pod is higher than the water pressure inside the ballast tank 11, seawater (i.e., water) is introduced from outside the pod 2 into the interior of the liquid chamber L via the water conduit 20. At the same time as this water is being supplied, by opening the air valve 32, the air inside the air chamber G is compressed by the external water pressure and the bellows-shaped side surface of the separator apparatus 50 is made to contract in an upward direction. The compressed air inside the air chamber G is then returned to the air storage tank 31 via the air duct 30 (see the left-side diagram in FIG. 5A). As a result, the volume of water inside the ballast tank 11 increases so that the buoyancy thereof decreases and the pod 2 sinks downwards.

In contrast, when discharging water from the ballast tank 11, by opening the water discharge valve 23 and driving the water discharge pump 21, the water inside the liquid chamber L is made to pass through the water conduit 20 and is discharged to the outside. Moreover, by opening the air valve 32 at the same time as this water is being discharged, the compressed air inside the air storage tank 31 is allowed to pass through the air duct 30 and is supplied to the interior of the air chamber G. This causes the bellows-shaped side surface of the separator apparatus 50 to expand downwards so that the water discharge is accelerated (see the right-side diagram in FIG. 5A). As a result, the volume of water inside the ballast tank 11 decreases so that the buoyancy thereof increases and the pod 2 floats upwards.

The separator apparatus 51 shown in FIG. 5B is a plate-shaped component that is supported horizontally inside the ballast tank 11 so as to separate the ballast tank 11 vertically, and is able to vertically slide along the internal circumferential surface of the ballast tank 11. A liner 51a that secures an airtight seal between the separator apparatus 51 and the internal circumferential surface of the ballast tank 11 is formed around the circumference of the separator apparatus 51 (i.e., on the portion thereof that slides against the internal circumferential surface of the ballast tank 11). In the separator apparatus 51 shown in FIG. 5B, by providing the liner 51a which has an increased width in the vertical direction, the slidability and airtightness of the separator apparatus 51 relative to the internal circumferential surface of the ballast tank 11 are secured. Moreover, the interior portion of the ballast tank 11 is separated by the separator apparatus 51 into the air chamber G that is formed above the separator apparatus 51, and the liquid chamber L that is formed below the separator apparatus 51.

When supplying water to the ballast tank 11, by opening the water supply valve 25 while the water pressure outside the pod is higher than the water pressure inside the ballast tank 11, seawater (i.e., water) is introduced from outside the pod 2 into the interior of the liquid chamber L via the water conduit 20. At the same time as this water is being supplied, by opening the air valve 32, the air inside the air chamber G is compressed by the external water pressure so that the separator apparatus 51 is lifted up, and the compressed air inside the air chamber G is returned to the air storage tank 31 via the air duct 30 (see the left-side diagram in FIG. 5B). As a result, the volume of water inside the ballast tank 11 increases so that the buoyancy thereof decreases and the pod 2 sinks downwards.

In contrast, when discharging water from the ballast tank 11, by opening the water discharge valve 23 and driving the water discharge pump 21, the water inside the liquid chamber L is made to pass through the water conduit 20 and is discharged to the outside. Moreover, by opening the air valve 32 at the same time as this water is being discharged, the compressed air inside the air storage tank 31 is allowed to pass through the air duct 30 and is supplied to the interior of the air chamber G. This causes the separator apparatus 51 to drop downwards so that the water discharge is accelerated (see the right-side diagram in FIG. 5B). As a result, the volume of water inside the ballast tank 11 decreases so that the buoyancy thereof increases and the pod 2 floats upwards.

Note that the separator apparatus 51 may be regarded as a piston that slides up and down inside the ballast tank 11. Because of this, it is also possible to attach a rod or the like (not shown) to the separator apparatus 51, and for the vertical motion of the separator apparatus 51 to be utilized for other tasks via this rod.

The separator apparatus 52 shown in FIG. 5C is an elastically deformable bag-shaped container that is supported at a top end portion of the interior of the ballast tank 11, and hangs down inside the ballast tank 11. An internal portion of the separator apparatus 52 is connected at a top end thereof to the air duct 30. Namely, the interior of the ballast tank 11 is separated by the separator apparatus 52 into an air chamber G that is formed inside the separator apparatus 52, and a liquid chamber L that is formed outside the separator apparatus 52.

When supplying water to the ballast tank 11, by opening the water supply valve 25 while the water pressure outside the pod is higher than the water pressure inside the ballast tank 11, seawater (i.e., water) is introduced from outside the pod 2 into the interior of the liquid chamber L via the water conduit 20. At the same time as this water is being supplied, by opening the air valve 32, the air inside the air chamber G is compressed by the external water pressure and the separator apparatus 52 is made to contract. The compressed air inside the air chamber G is then returned to the air storage tank 31 via the air duct 30 (see the left-side diagram in FIG. 5C). As a result, the volume of water inside the ballast tank 11 increases so that the buoyancy thereof decreases and the pod 2 sinks downwards.

In contrast, when discharging water from the ballast tank 11, by opening the water discharge valve 23 and driving the water discharge pump 21, the water inside the liquid chamber L is made to pass through the water conduit 20 and is discharged to the outside. Moreover, by opening the air valve 32 at the same time as this water is being discharged, the compressed air inside the air storage tank 31 is allowed to pass through the air duct 30 and is supplied to the interior of the air chamber G This causes the separator apparatus 52 to expand so that the water discharge is accelerated (see the right-side diagram in FIG. 5C). As a result, the volume of water inside the ballast tank 11 decreases so that the buoyancy thereof increases and the pod 2 floats upwards.

In this manner, by providing inside the ballast tank 11 the separator apparatuses 50, 51, and 52 that separate the water and air that are supplied to the interior of the ballast tank 11, it is possible to prevent any contact between the water and air inside the ballast tank 11 without impeding the buoyancy adjustment that is performed via the ballast tank 11 using the air storage tank 31. As a result, any decrease in the air stored inside the air storage tank 31 that might be brought about by the discharge of water from the ballast tank 11 is prevented, and it becomes possible to smoothly discharge water over a prolonged period from the ballast tank 11 using the air that is stored inside the storage that tank 31.

Note that in the separator apparatuses 50 and 52 that are shown in FIGS. 5A and 5C, the interior of each of the separator apparatuses 50 and 52 is connected to the air duct 30 so as to form the air chamber G, and the portion of the interior of the ballast tank 11 that is separated from the air chamber G by the separator apparatuses 50 and 52 is connected to the water conduit 20 so as to form the liquid chamber L.

Figure 6A:
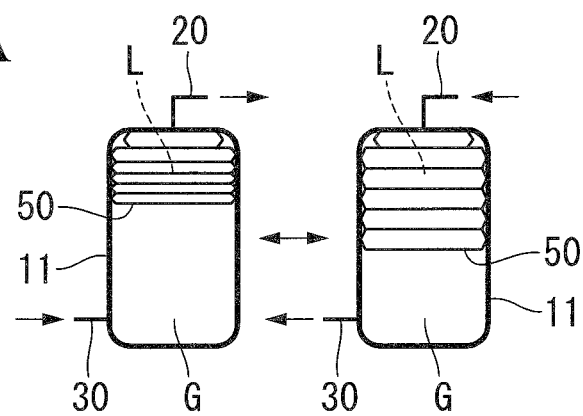
FIG. 6A is a typical view of a cross-section of a ballast tank showing an example of the structure of a separator device that is applied to the present disclosure.
Figure 6B:
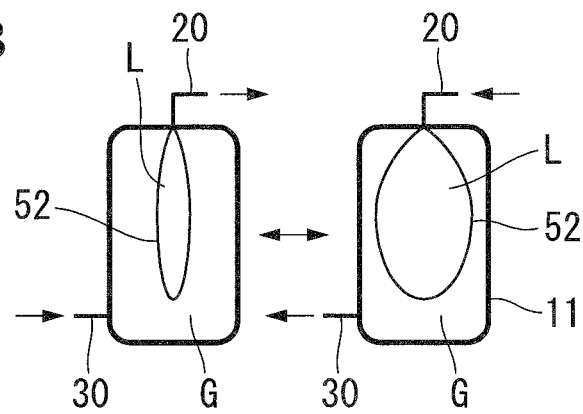
FIG. 6B is a typical view of a cross-section of a ballast tank showing an example of the structure of a separator device that is applied to the present disclosure.

However, as is shown in FIGS. 6A and 6B, it is also possible to employ a structure in which, in the above-described separator apparatuses 50 and 52, the interior of each of the separator apparatuses 50 and 52 is connected to the water conduit 20 so as to form the liquid chamber L, and the portion of the interior of the ballast tank 11 that is separated from the liquid chamber L by the separator apparatuses 50 and 52 is connected to the air duct 30 so as to form the air chamber G.

In this case, the interior of the ballast tank 11 is separated by the separator apparatuses 50 and 52 into the liquid chamber L that is formed inside the separator apparatus 50, and the air chamber G that is formed outside the separator apparatus 50.

According to the separator apparatuses 50 and 52 shown in FIGS. 6A and 6B, when supplying water to the ballast tank 11, by opening the water supply valve 25 while the water pressure outside the pod is higher than the water pressure inside the ballast tank 11, seawater (i.e., water) is introduced from outside the pod 2 into the liquid chamber L inside the separator apparatuses 50 and 52 via the water conduit 20, thereby causing the separator apparatuses 50 and 52 to expand. At the same time as this water is being supplied, by opening the air valve 32, the air inside the air chamber G that is compressed in conjunction with the expansion of the separator apparatuses 50 and 52 is returned to the air storage tank 31 via the air duct 30 (see the right-side diagram in FIGS. 6A and 6B). As a result, the volume of water inside the ballast tank 11 increases so that the buoyancy thereof decreases and the pod 2 sinks downwards.

In contrast, when discharging water from the ballast tank 11, by opening the water discharge valve 23 and driving the water discharge pump 21, the water inside the liquid chamber L is made to pass through the water conduit 20 and is discharged to the outside. Moreover, by opening the air valve 32 at the same time as this water is being discharged, the compressed air inside the air storage tank 31 is allowed to pass through the air duct 30 and is supplied to the interior of the air chamber G. This causes the separator apparatuses 50 and 52 to contract so that the water discharge is accelerated (see the left diagram in FIGS. 6A and 6B). As a result, the volume of water inside the ballast tank 11 decreases so that the buoyancy thereof increases and the pod 2 floats upwards.

Namely, in the separator apparatuses 50 and 52 shown in FIGS. 6A and 6B as well, it is possible to prevent any contact between the water and air inside the ballast tank 11 without impeding the buoyancy adjustment that is performed via the ballast tank 11 using the air storage tank 31. As a result, any decrease in the air stored inside the air storage tank 31 that might be brought about by the discharge of water from the ballast tank 11 is prevented, and it becomes possible to smoothly discharge water over a prolonged period from the ballast tank 11 using the air that is stored inside the storage that tank 31.

Note that provided that it is possible to prevent any contact between the water and air inside the ballast tank 11 while, at the same time, the buoyancy adjustment that is performed via the ballast tank 11 using the air storage tank 31 is not impeded, then the specific structure that is employed is not limited to the structures shown in FIGS. 5A through 5C and in FIGS. 6A and 6B.

While a description of embodiments of the disclosure has been given above, the present disclosure is not limited to the above-described embodiment. Additions, omissions, substitutions, and other modifications can be made insofar as they do not depart from the spirit or scope of the present disclosure. Accordingly, the disclosure is not limited by the foregoing description and is only limited by the scope of the appended claims.

For example, the turbine 4 according to each of the above-described embodiments is formed by the two blades 6 and 6, however, the number of blades is not limited to this. The installation position of the turbine 4 in the respective pods 2 is also not limited to the tail portion of the pod 2, and the turbine 4 may also be installed in a front portion (i.e., on the sinker 8 side) or in an intermediate portion of the pod 2, or in a combination of these positions. Moreover, in each of the above-described embodiments, a pair of left and right pods 2 and 2 are connected together via the connecting beam 3, however, it is also possible for just one pod 2 to be used, or for three or more pods 2 and 2 to be linked together via the connecting beam 3 or the like.

Furthermore, it is also possible for a plurality of pods 2 and 2 to be arranged vertically to each other, or both vertically and horizontally to each other.

Moreover, in addition to a Y shape in which mooring cables 7 extend out from each pod 2 and are then joined together partway along their length, the shape of the mooring cable 7 may also be a V shape in which one end of each mooring cable 7 extends from each of the pods 2, and the other end thereof is connected to the same sinker 8. Alternatively, it is also possible for either one or a plurality of mooring cables 7 to extend from each individual pod 2, or from the beam 3 that joins the pods 2 and 2 together. If a plurality of pods 2 and 2 are arranged both vertically and horizontally relative to each other, then the mooring cables 7 that extend out from each of these pods 2 and 2 may be arranged three-dimensionally such as, for example, in an X shape when viewed from the front. Moreover, the number of sinkers 8 to which the other end of the mooring cables 7 is connected may either be one or a plurality of sinkers 8. Alternatively, a known mooring method other than using the mooring cable 7 may also be employed.

Moreover, in each of the above-described embodiments, a ballast tank 11 is provided inside each one of a pair of pods 2, however, the shape and structure of the ballast tanks are not limited to this, and it is also possible to provide a ballast tank within the connecting beam. Furthermore, the present disclosure is not limited to a structure in which one ballast tank 11 is provided inside a pod 2, and it is also possible, for example, to provide a plurality of ballast tanks inside a pod 2.

Moreover, in the above-described embodiments, the supplying of water to a ballast tank 11 is performed utilizing the water pressure outside the pod 2, however, it is also possible to provide a water supply pump on the water conduit.

Moreover, in each of the above-described embodiments, the air storage tank 31 is filled with compressed air, however, the compressed gas that is stored inside the air storage tank may also be a gas other than air.

Moreover, in each of the above-described embodiments, a case is described in which the present disclosure is applied to the ocean current power generation devices 1 and 40, however, the present disclosure may also be applied to underwater floating-type underwater devices other than the ocean current power generation devices 1 and 40 in which the buoyancy is adjusted by means of the ballast tanks 11 utilizing the air storage tank 31. For example, the present disclosure may also be applied to manned or unmanned self-propelled underwater sailing vessels, towed barges, underwater working robots, and other structural objects (i.e., floating bodies and the like) that are confined underwater.

INDUSTRIAL APPLICABILITY

According to the present disclosure, an underwater floating-type underwater device is obtained in which it is possible to make repeated buoyancy adjustments using a buoyancy adjustment unit.

What is claimed is:

1. An underwater floating-type underwater device comprising:
   a buoyancy adjustment unit that adjusts buoyancy by supplying or discharging water;
   a water conduit that connects the buoyancy adjustment unit and an outside of the underwater device;
   a water discharge pump that is provided at the water conduit and that discharges water from the buoyancy adjustment unit to the outside of the underwater device through the water conduit; and
   a gas storage device inside which a compressed gas is stored in advance, and that, when water is being discharged from the buoyancy adjustment unit by the water discharge pump, supplies its internally stored compressed gas to the buoyancy adjustment unit, and that, when water is being supplied to the buoyancy adjustment unit, receives the supplied gas back into its interior.

2. The underwater device according to claim 1, wherein the underwater device is an underwater floating-type ocean current power generation device further comprising: a turbine that is rotated by a flow of seawater; and a pod that supports the turbine, and wherein the pod houses a power generation unit that generates power using the rotation of the turbine.

3. The underwater device according to claim 1, wherein the buoyancy adjustment unit is supplied with water by the external water pressure outside the buoyancy adjustment unit, and,
   when this water is being supplied to the buoyancy adjustment unit, the gas that was supplied to the buoyancy adjustment unit is returned to the interior of the gas storage device via the water that is being supplied by the water pressure.

4. The underwater device according to claim 2, wherein the buoyancy adjustment unit is supplied with water by the external water pressure outside the pod, and,
   when this water is being supplied to the buoyancy adjustment unit, the gas that was supplied to the buoyancy adjustment unit is returned to the interior of the gas storage device via the water that is being supplied by the water pressure.

5. The underwater device according to claim 2, wherein the water discharge pump performs the water discharge for the buoyancy adjustment unit in accordance with the rotation speed of the turbine.

6. The underwater device according to claim 4, wherein the water discharge pump performs the water discharge for the buoyancy adjustment unit in accordance with the rotation speed of the turbine.

7. The underwater device according to claim 1, further comprising:
   a duct component that includes a telescopic mechanism that is configured to be both extended and contracted, and to be extended as far as the surface of the sea; and
   a gas compression device that takes in external air through the duct component and compresses this air, and fills the gas storage device with this compressed air.

8. The underwater device according to claim 2, further comprising:
   a duct component that includes a telescopic mechanism that is configured to be both extended and contracted, and to be extended as far as the surface of the sea; and
   a gas compression device that takes in external air through the duct component and compresses this air, and fills the gas storage device with this compressed air.

9. The underwater device according to claim 1, wherein a plurality of the buoyancy adjustment units are arranged horizontally, and the buoyancy adjustment units can be floated upwards or downwards while maintaining a predetermined attitude by the supply or discharge of water to the individual buoyancy adjustment units by the water discharge pump and the gas storage device.

10. The underwater device according to claim 2, wherein a plurality of the pods are arranged horizontally and the buoyancy adjustment units are provided in each one of the pods, and the plurality of pods can be floated upwards or downwards while maintaining their attitude horizontally by the supply or discharge of water to the individual buoyancy adjustment units by the water discharge pump and the gas storage device.

11. The underwater device according to claim 4, wherein a plurality of the pods are arranged horizontally and the buoyancy adjustment units are provided in each one of the pods, and the plurality of pods can be floated upwards or downwards while maintaining their attitude horizontally by the supply or discharge of water to the individual buoyancy adjustment units by the water discharge pump and the gas storage device.

12. The underwater device according to claim 9, wherein each buoyancy adjustment unit is provided with a separator apparatus that separates water that is supplied to the buoyancy adjustment unit from gas that is supplied from the gas storage device to the buoyancy adjustment unit.

13. The underwater device according to claim 10, wherein each buoyancy adjustment unit is provided with a separator apparatus that separates water that is supplied to the buoyancy adjustment unit from gas that is supplied from the gas storage device to the buoyancy adjustment unit.

14. The underwater device according to claim 1, wherein said conduit includes a first portion through which water passes from said buoyancy adjustment unit to the outside, and wherein said pump is positioned along said first portion, and wherein said conduit further includes a second portion through which water passes in a direction from the outside toward the buoyancy adjustment unit, and wherein said second portion of said conduit is arranged to bypass said pump.

15. The underwater device according to claim 14, wherein a first non-return valve and a discharge valve are positioned along said first portion of said conduit, and a second non-return valve and a supply valve are positioned along said second portion of said conduit.

16. The underwater device of claim 14, wherein a gas duct connects the buoyancy adjustment unit and the gas storage device, and wherein when water is supplied to the buoyancy adjustment unit, pressure inside the buoyancy adjustment unit causes gas to flow from the buoyancy adjustment unit through the gas duct and into the gas storage device.

* * * * *